Aug. 16, 1960  C. O. LOCKLEAR  2,948,983
FISH LURE
Filed May 29, 1959
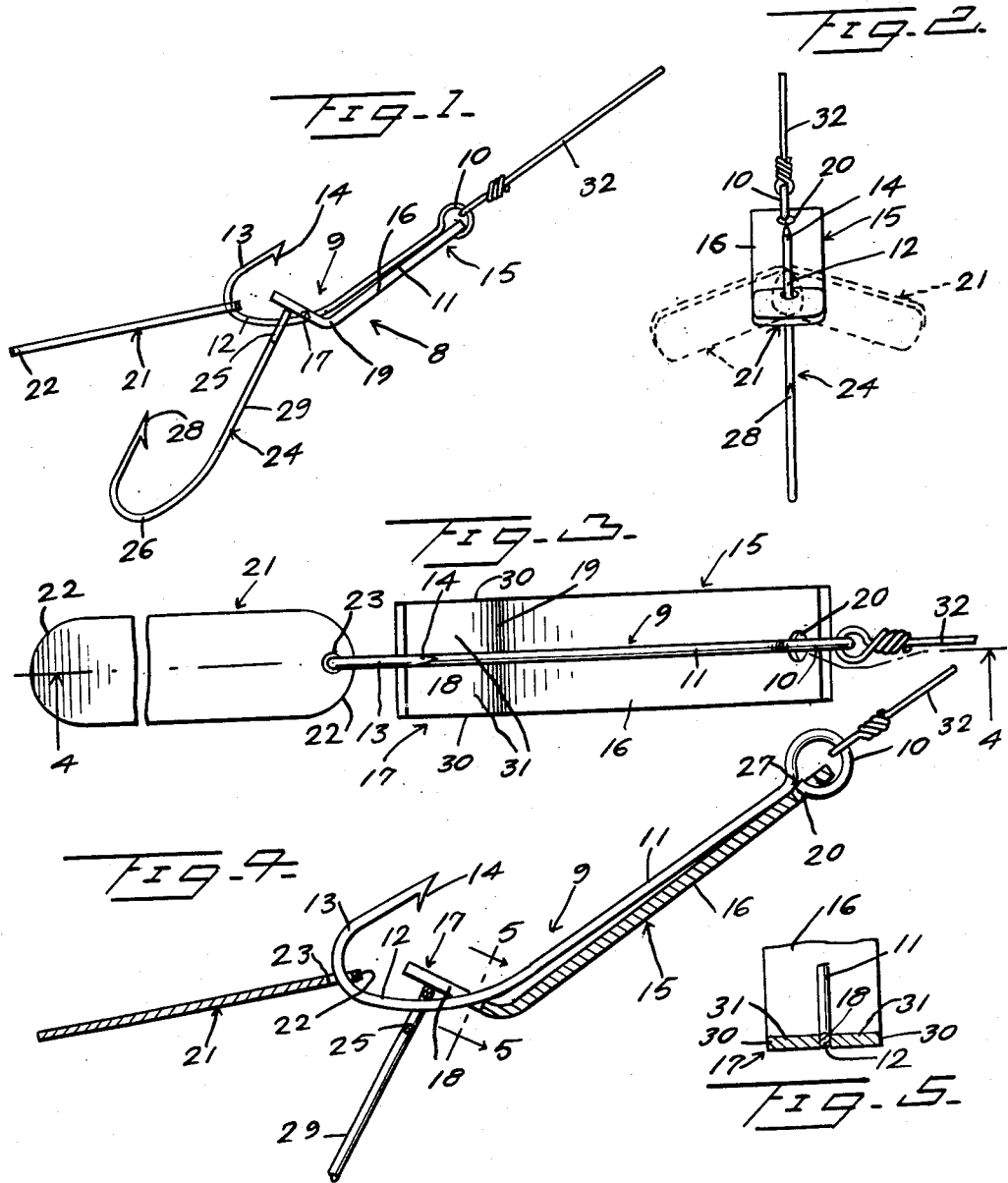
INVENTOR
CECIL O. LOCKLEAR
BY 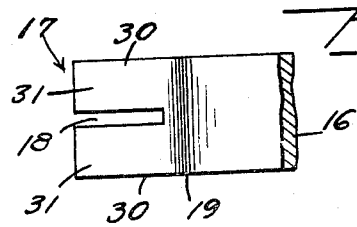
ATTORNEY

2,948,983

FISH LURE

Cecil O. Locklear, 2409 Chapel Hill Road, Durham, N.C.

Filed May 29, 1959, Ser. No. 816,807

6 Claims. (Cl. 43—42.18)

This invention relates to a novel fish lure of extremely simple construction and which requires no fastening devices, bonding material or other means for assembling the fish lure parts.

Another object of the invention is to provide a fish lure wherein a fishing line or leader is connected directly to the eye of a fishhook of the lure, and which fishhook provides a support for the other elements of the lure.

Various other objects and advantages of the invention will hereinafter become more fully apparent from the following description of the drawing, illustrating a presently preferred embodiment thereof, and wherein:

Figure 1 is a side elevational view showing the fish lure in substantially the position that the parts thereof will assume as the lure is being trolled or retrieved;

Figure 2 is an end elevational view, looking toward the trailing end of the fish lure, or from left to right of Figure 1;

Figure 3 is an enlarged fragmentary top plan view of the fish lure;

Figure 4 is a fragmentary longitudinal sectional view of the lure, taken substantially along the line 4—4 of Figure 3;

Figure 5 is a fragmentary transverse sectional view, taken susbtantially along a plane as indicated by the line 5—5 of Figure 4, and Figure 6 is a cross sectional view of one part of the lure.

Referring more specifically to the drawing, the fish lure in its entirety is designated generally 8 and includes a conventional fishhook 9 of the type having an open eye 10 at the forward end of its shank 11 and which is disposed substantially coplanar to the bend 12 of said hook 9, from which projects a short leg 13 which terminates in the pointed and barbed end 14.

The lure 8 includes a lure body 15 formed from a single elongated bar having a substantially straight and flat forward portion 16 and a substantially straight and flat rear portion 17. Said rear portion 17 is disposed at an obtuse angle to the forward portion 16 and is provided, midway of its side edges, with a notch 18 which opens outwardly of the trailing distal end thereof and which extends inwardly to adjacent the bend 19 which forms the apex of the lure body portions 16 and 17. The forward lure body portion 16 is provided with an opening 20, which is likewise disposed midway between the side edges thereof, and in axial alignment with the notch 18.

The fish lure 8 also includes a substantially rigid elongated blade 21 of substantially the same width as the bar 16, which is straight and flat throughout its length and which has rounded ends 22 and an opening 23 located adjacent one of said ends, and midway between the side edges of the blade 21. Said blade 21 forms a second lure body.

The lure 8 also includes a second fishhook 24, in tandem relation to hook 9 of conventional construction and preferably of approximately the same size as the fishhook 9. However, the eye 25 at the shank end of the hook 24 is disposed approximately crosswise of the plane of the bend 26 of said hook, and said eye 25 may be of the ring type which cannot be opened.

The fish lure 8 is assembled from the parts 9, 15, 21 and 24 by first applying the blade 21 to the fishhook 9 by passing the distal end 27 of the open eye 10 through the blade opening 23 and then moving the blade opening around the open eye 10 and along the shank 11 to the bend 12, after which the hook eye 25 is similarly applied to the hook 9 and with the bend 26 and barbed end 28 thereof extending rearwardly or disposed behind the shank 29 of said hook 24, as seen in Figure 1, and so that the blade 21 is disposed above or behind the hook 24. The distal end 27 of the open eye 10 is then passed upwardly through the opening 20, and pressure is applied to the eye 10, as by means of a pair of pliers, not shown, for closing said eye with the lure body 15 applied thereto, as best illustrated in Figure 4, and so that the hook shank 11 is disposed above the lure body 15. The lure body 15 can then be swung upwardly toward the hook 9 to engage a part of the bend 12, which extends from the shank 11, in the inner portion of the notch 18, since the forward portion 16 of the lure body 15 is of approximately the same length as the hook shank 11. A compressive force is then applied to the side edges 30 of the rear bar portion 17 for displacing the furcations 31 thereof, formed by the notch 18, toward one another to restrict said notch, as seen in Figure 3, for clamping a part of the bend 12 in the inner end of the notch 18, to thereby secure the lure body 15 immovably to the hook 9 and with the forward bar portion 16 disposed beneath the hook shank 11. As seen in the drawing, the eye 25 and opening 23 engage the bend 12 behind the rear bar portion 17 which thus forms a stop to limit movement of the eye 25 and blade 21 along the bend 12 toward the hook shank 11. The barb or the barbed point 14 is of sufficient size so that it cannot pass through the opening 23. Thus, the hook 24 and blade 21 are slidably and swingably confined on the bend 12.

The blade 21 is of a length relative to the length of the hook 24 so that the free end thereof will fit loosely in the bend 26, when the lure 8 is not in use. An end of a fishing line or leader 32 is secured in a conventional manner to the closed eye 10. When the lure is drawn through the water in a direction from left to right of Figures 1, 3 and 4, by the line or leader 32, pressure of the water against the underside of the blade 21 will cause said blade to move upwardly away from the hook 24 and will also cause the blade to swing laterally back and forth relative to the hook 9 and to rock about its longitudinal axis, during such swinging movement, as illustrated in dotted lines in Figure 2. Only a slight trolling or retrieving of the lure 8, or even holding the lure in a flowing stream, is necessary to cause the blade 21 to execute the aforedescribed movement, which effectively simulates swimming movement of a small minnow and has proven extremely efficient in luring game fish, especially those which will not follow a fast moving lure. Most game fish strike a lure from below so that the rear hook 24 in its exposed position beneath the oscillating and wobbling blade 21 is usually directly in the path of the fish and will be taken by the fish striking at the blade. However, if the fish strikes from above the blade, the exposed barbed point 14 of the forward hook 9 is in a position to be taken by the fish. Thus, the lure 8 provides a tandem hook lure on either hook of which a fish can be caught.

The lure body 15 also functions for attracting fish and together with the forward hook 9 will follow a zigzag course when the lure 8 is trolled or retrieved more rapidly. Swinging movement of the blade 21 increases the tendency of the lure body 15 and hook 9 to swing back and forth.

The bar 15 and blade 21 are preferably formed of metal and may be of any desired color and surface configuration, either corresponding with one another or dissimilar. Likewise, the lure 8 may comprise only the hook 9 and bar 15.

Various modifications and changes are contemplated and may be resorted to, without departing from the function or scope of the invention as hereinafter defined by the appended claims.

I claim as my invention:

1. A fish lure comprising a fishhook including a shank, a barbed point, a bend portion disposed between an end of the shank and the barbed point, and an eye located at the opposite end of said shank and disposed approximately coplanar with the bend of the hook, and a lure body formed from a bar including a forward portion and a rear portion, said bar portions each being substantially flat and forming an obtuse angle with one another, said forward bar portion being longer than the rear bar portion and having an opening adjacent a forward end thereof, said hook eye having a part interengaged with the pening to position another part of the hook eye beyond the forward end of the bar, said forward bar portion being disposed beneath the hook shank and the rear bar portion extending upwardly therefrom and having an outwardly opening notch in which a part of the fishhook is clamped for anchoring said lure body immovably to the hook.

2. A fish lure as in claim 1, the upper free end of said rear bar portion being disposed within the bend of the hook, a tandem fishhook having an eye loosely engaging said bend of the first mentioned hook behind said rear bar portion, and an elongated substantially flat blade, constituting a second lure body, having an opening adjacent a forward end thereof through which a part of the bend of the first mentioned hook swingably extends for loosely mounting said blade and said tandem fishhook on the first mentioned hook with said blade disposed between the barbed point thereof and the eye of the tandem hook, the eye of said tandem hook being disposed crosswise of the plane of said hook.

3. A fish lure comprising a fishhook having an attaching eye disposed substantially coplanar with the hook, and a lure body comprising a bar having a forward portion disposed beneath the hook shank and provided adjacent the forward end thereof with an opening interengaged with said hook eye, said hook eye having a part extending beyond the forward end of the bar, said lure body having an upwardly inclined rear portion provided with furcations straddling a part of the hook and in which said hook part is clamped for securing the lure body immovably to the hook, said rear bar portion extending into the bend of the hook and being spaced from the barbed point of the hook.

4. A fish lure as in claim 3, said furcations defining a deep narrow notch therebetween in the inner end of which said hook portion is received, and said furcations being displaced toward one another for restricting the outer end of the notch and for wedging said hook portion immovably in the inner end thereof.

5. A fish lure as in claim 3, said eye constituting a line or leader attaching part of the lure.

6. A fish lure as in claim 3, a second tandem fishhook having an eye disposed crosswise of the plane of said tandem hook and loosely engaging the first mentioned hook behind said rear bar portion, and an elongated substantially flat blade having one end loosely engaging said first mentioned hook behind the eye of the tandem hook for swingably mounting the tandem hook and blade on the first mentioned hook.

References Cited in the file of this patent

UNITED STATES PATENTS

| 1,763,031 | Yates | June 10, 1930 |
| 1,789,630 | Knight | Jan. 20, 1931 |
| 1,888,641 | Toepper | Nov. 22, 1932 |
| 2,385,274 | Hammond | Sept. 18, 1945 |
| 2,645,875 | Chase | July 21, 1953 |